US012435490B2

(12) United States Patent
Viergutz et al.

(10) Patent No.: US 12,435,490 B2
(45) Date of Patent: Oct. 7, 2025

(54) ELECTRO-HYDRAULIC CONTROLLED EXCAVATOR TRAVEL TO TOOL CONTROL PRIORITY FUNCTION

(71) Applicant: Caterpillar SARL, Geneva (CH)

(72) Inventors: Michael Aron Viergutz, Bloomington, IL (US); Kensuke Tanaka, Kobe (JP); Atsunori Shimamoto, Akashi (JP); Matthew James Beschorner, Plainfield, IL (US)

(73) Assignee: Caterpillar SARL, Geneva (CH)

( * ) Notice: Subject to any disclaimer, the term of this patent is extended or adjusted under 35 U.S.C. 154(b) by 574 days.

(21) Appl. No.: 17/854,113

(22) Filed: Jun. 30, 2022

(65) Prior Publication Data

US 2024/0003118 A1 Jan. 4, 2024

(51) Int. Cl.

*E02F 9/22* (2006.01)
*F15B 11/17* (2006.01)
*F15B 21/08* (2006.01)

(52) U.S. Cl.

CPC ............ *E02F 9/2242* (2013.01); *F15B 11/17* (2013.01); *F15B 21/082* (2013.01); *F15B 2211/6658* (2013.01)

(58) Field of Classification Search

CPC .............................. F15B 11/17; F15B 21/082; F15B 2211/6658; E02F 9/2239; E02F 9/2242; E02F 9/2253; E02F 9/2292

See application file for complete search history.

(56) References Cited

U.S. PATENT DOCUMENTS

| | | | | |
|---|---|---|---|---|
| 7,614,225 | B2 * | 11/2009 | Kim | E02F 9/2239 60/428 |
| 8,521,374 | B2 * | 8/2013 | Karasawa | F16H 61/4148 701/50 |
| 9,016,052 | B2 | 4/2015 | Cho | |
| 9,074,347 | B2 | 7/2015 | Vigholm et al. | |
| 9,551,132 | B2 * | 1/2017 | Lim | E02F 9/226 |
| 9,562,345 | B2 * | 2/2017 | Lee | E02F 9/2242 |
| 9,580,888 | B2 | 2/2017 | Ahn et al. | |
| 10,145,391 | B2 * | 12/2018 | Fukuda | F16K 15/02 |
| 10,865,544 | B2 * | 12/2020 | Kim | E02F 9/2253 |

(Continued)

FOREIGN PATENT DOCUMENTS

| | | | | |
|---|---|---|---|---|
| EP | 1898104 A1 | | 3/2008 | |
| EP | 3913232 | | 11/2021 | |
| WO | WO-2024260581 A1 | * | 12/2024 | E02F 3/28 |

OTHER PUBLICATIONS

Written Opinion and International Search Report for Int'l. Patent Appln. No. PCT/EP2023/025293, mailed Sep. 18, 2023 (76 pgs).

*Primary Examiner* — Michael Leslie

(57) ABSTRACT

A work machine can include a frame; transportation devices coupled to the frame; a work tool coupled to the frame; a hydraulic system to provide power to operate the transportation devices and the work tool; and a controller configured to operate in a first mode wherein a first hydraulic pump is configured to deliver hydraulic fluid to the transportation devices and a second hydraulic pump is configured to deliver hydraulic fluid to the work tool, and wherein the controller can operate in a second mode wherein the work tool is provided with hydraulic fluid from both the first and the second hydraulic pumps.

15 Claims, 3 Drawing Sheets

(56) References Cited

U.S. PATENT DOCUMENTS

| | | | | |
|---|---|---|---|---|
| 10,934,687 | B2 | 3/2021 | Young | |
| 11,718,977 | B2 * | 8/2023 | Kumagai .............. | E02F 9/2282 60/421 |
| 2009/0288408 | A1 * | 11/2009 | Tozawa ................... | F15B 11/17 60/435 |
| 2015/0368879 | A1 | 12/2015 | Peterson et al. | |
| 2021/0309287 | A1 | 10/2021 | Zhang et al. | |

* cited by examiner

ELECTRO-HYDRAULIC CONTROLLED EXCAVATOR TRAVEL TO TOOL CONTROL PRIORITY FUNCTION

TECHNICAL FIELD

This disclosure relates to road construction equipment, and more specifically to an electro-mechanically controlled work machine.

BACKGROUND

Work machines can use hydraulic power to perform many mechanical functions of the work machines. For example, excavators and other hydraulic work machines can use a boom, stick, and bucket to move dirt or other materials using controls positioned within an operator station of the machine.

Currently, hydraulic excavators can use two hydraulic pumps and a mechanical control dedicates one of the pumps to a machine travel hydraulic circuit while another pump is used for a work tool hydraulic circuit when functions are combined. This same hydraulic control system is also applied to electro-hydraulically controlled excavators. However, this system leads to a loss of flow for the work tool when operating a high flow or high-power work tool.

U.S. Pat. No. 10,934,687 discusses a power machine with a hydraulic system where a controller is configured to monitor the power in each of an implement circuit and a drive circuit and to adjust pump flow to manage engine power consumption.

SUMMARY

In an example according to this disclosure, a work machine can include a frame; transportation devices coupled to the frame; a work tool coupled to the frame; a hydraulic system to provide power to operate the transportation devices and the work tool; and a controller configured to operate in a first mode wherein a first hydraulic pump is configured to deliver hydraulic fluid to the transportation devices and a second hydraulic pump is configured to deliver hydraulic fluid to the work tool, and wherein the controller can operate in a second mode wherein the work tool is provided with hydraulic fluid from both the first and the second hydraulic pumps.

In another example according to the present disclosure, a system for controlling operation of a work machine can include a hydraulic system to provide power to operate transportation devices of the work machine and a work tool of the work machine; and a controller configured to operate in a first mode wherein a first hydraulic pump is configured to deliver hydraulic fluid to the transportation devices and a second hydraulic pump is configured to deliver hydraulic fluid to the work tool, and wherein the controller can operate in a second mode wherein the work tool is provided with hydraulic fluid from both the first and the second hydraulic pumps.

In another example according to the present disclosure, a method for operating a work machine can include operating the work machine in a first mode of operation wherein a first hydraulic pump is configured to deliver hydraulic fluid to transportation devices and a second hydraulic pump is configured to deliver hydraulic fluid to a work tool of the work machine; and changing to a second mode of operation wherein the work tool is provided with hydraulic fluid from both the first and the second hydraulic pumps.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
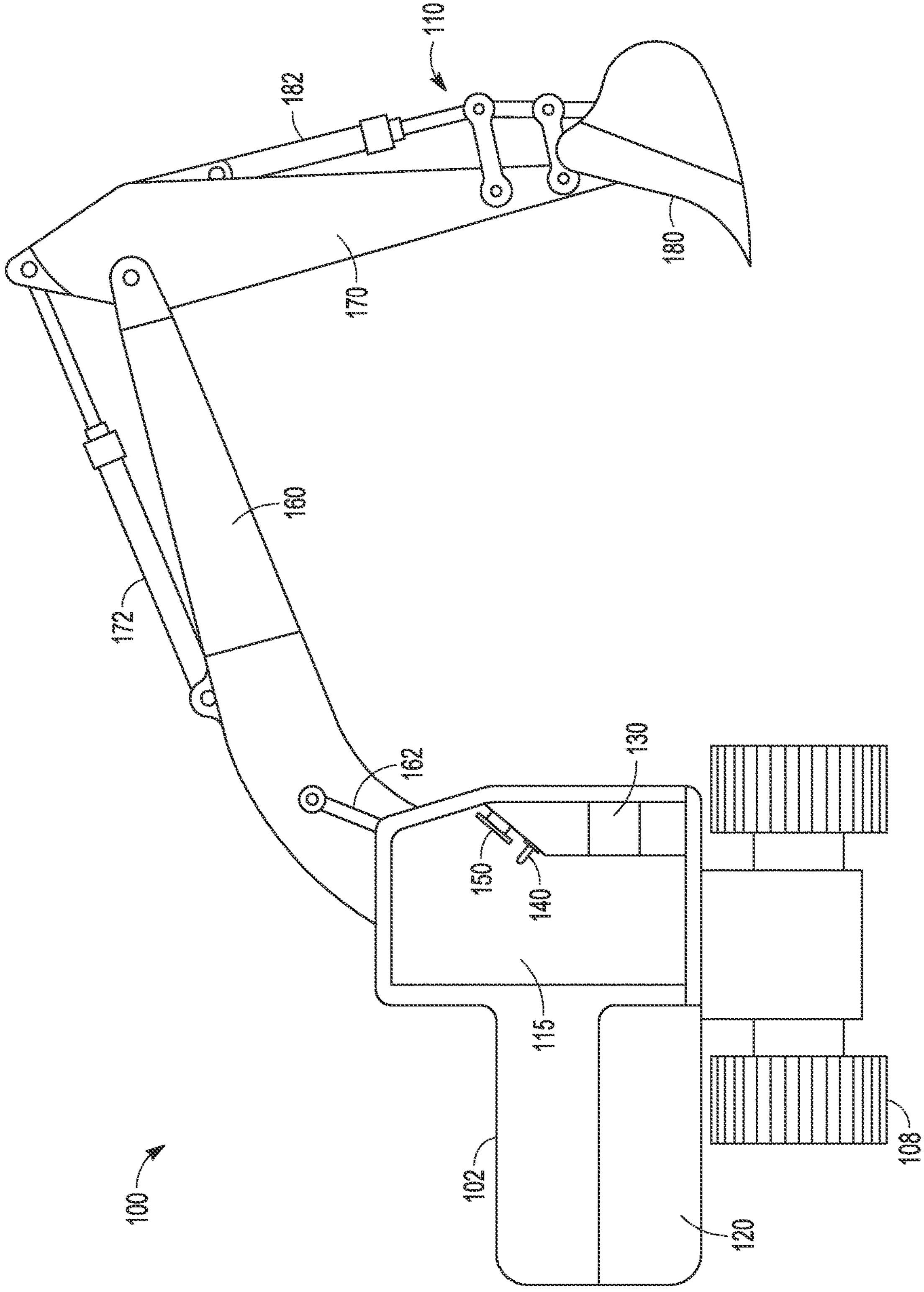
FIG. 1 shows a side view of an excavator machine, in accordance with one embodiment.

FIG. 1 shows a side view of a work machine 100, such as an excavator machine, in accordance with at least one example of the present disclosure. The work machine 100 can include a frame 102 and transportation devices 108 coupled to the frame 102. For example, the transportation devices 108 can include wheels or tracks. As part of the movement of work machine 100, the work machine 100 can also provide steering capability to the work machine 100 via the steering devices 108. For example, the work machine steering can be accomplished by a skid-steer system or by turning of the transportation devices 108. The work machine 100 further includes a work tool 110 coupled to the frame 102, and a hydraulic system 120 to provide power to operate the transportation devices 108 and the work tool 110.

In this example, the work machine 100 can include an excavator machine and the work tool 110 can include a boom 160, a stick 170, and a work implement 180 which act in combination. In various examples, the work implement 180 can include a bucket, a shovel, a scoop, and a blade. In one example, the excavator machine can be an electro-hydraulic controlled excavator machine. For example, the boom 160, stick 170, and the work implement 180 can be operated via hydraulic cylinders 162, 172, and 182, respectively, operated via a controller 130 which can be used to coordinate the movements and actions of the work tool 110.

An operator station 115 on the work machine 100 can be used to operate the work machine 100. In various examples, the operator station 115 can include a monitor 150 which can provide input/output information to the machine operator. Further one or more input devices 140 and other controls can be mounted within the operator station 115 for controlling the operation of the work machine. For example, such operations can include operating an engine of the work machine 100, operating the transportation devices 108 and steering of the work machine 100, operating the hydraulic system 120, and operating the boom 160, the stick 170 and the implement 180.

The hydraulic system 120 can include one or more hydraulic pumps connected to the engine of the work machine 100 and can be powered thereby. In some examples, the hydraulic pumps can be connected to one or more valves for controlling and distributing hydraulic fluid to various hydraulic actuators of the work machine 100, such as the hydraulic cylinders 162, 172, 182 and the steering and transportation devices 108.

Each of the hydraulic cylinders 162, 172, and 182 can be connected to and powered by the hydraulic system 120, as noted above. The hydraulic cylinder 162 can be connected to the frame 102 and the boom 160; the hydraulic cylinder 172 can be connected to the boom 160 and the stick 170; and the hydraulic cylinder 182 can be connected to the stick 170 and the implement 180.

In operation of some examples, an operator can use the controls and input devices 140 within the operator station 115 to move the work machine 100 using the transportation devices 108. The operator can further articulate the boom 160 and stick 170 to position the implement 180 relative to the frame 102 to perform various tasks, such as moving dirt and other materials during an excavating process.

As noted above, currently, hydraulic excavators can use two hydraulic pumps and dedicate one of the pumps to a machine travel hydraulic circuit while the other pump is used for a work tool hydraulic circuit when functions are combined. However, this system leads to a loss of flow for a work tool when operating a high flow or high-power work tool. Therefore, this control system is undesirable in applications where flow to the work tool should have priority over base machine travel operations.

The present system allows for work tool over travel control priority for an excavator. For example, an option can be provided to an operator to toggle the control of a straight travel logic directly in a machine monitor menu. The toggle of this switch gives a user choice to enable a single pump to travel assignment or to provide the desired flow to the work tool from both the hydraulic pumps at priority over the base machine function.

In another option, toggling the logic on and off can be operated by an electronic signal, such as a message from another controller to the controller 130, or the logic can be automatically configured to turn on when the controller 130 receives inputs for both the travel and the work tool. For example, the work machine 100 can either have the work tool information loaded into the controller 130 so the controller 130 knows the control configurations for the work tool, or an outside signal can send a message to the controller 130 informing the machine what work tool is on the machine and the power requirements that come with it. So, in cases when the work tool power requirements are high and it is desirable for the work tool to get priority over the travel, the controller 130 would automatically enable the logic when giving commands to the transportation devices and the work tool at the same time.

Figure 2:
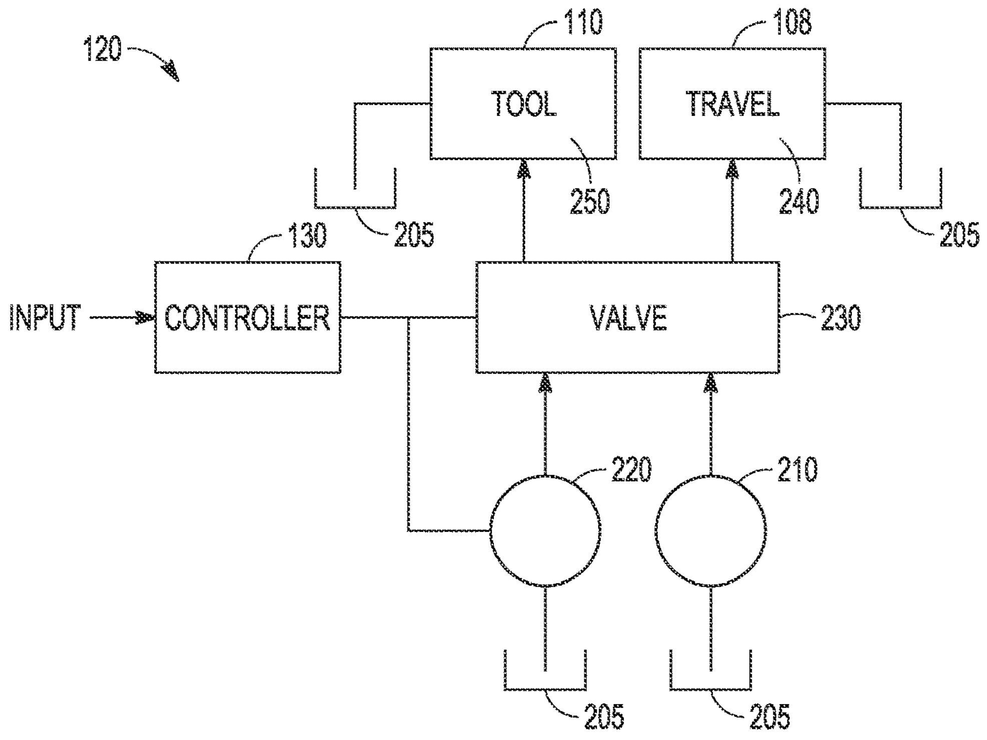
FIG. 2 shows a schematic representation of a first mode of operation of a hydraulic system, in accordance with one embodiment.
Figure 3:
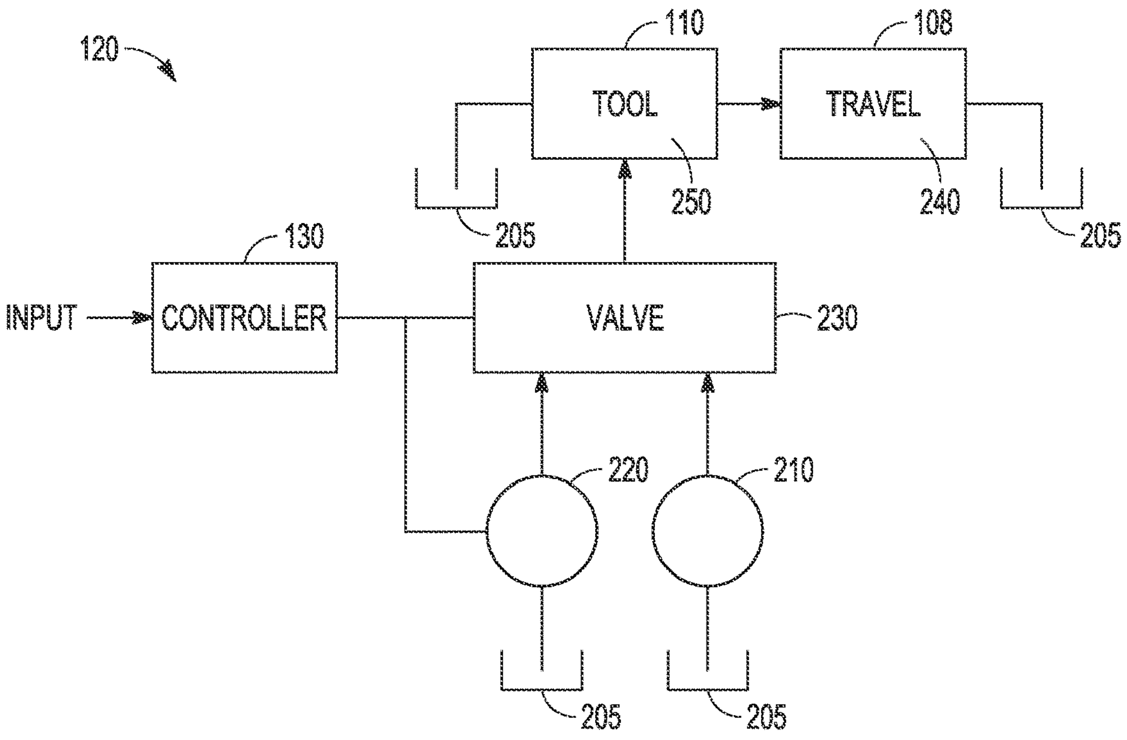
FIG. 3 shows a schematic representation of a second mode of operation for the hydraulic system, in accordance with one embodiment.

FIG. 2 shows a schematic representation of a first mode of operation of the hydraulic system 120; and FIG. 3 shows a schematic representation of a second mode of operation for the hydraulic system 120, in accordance with one embodiment of the present system. As will be discussed, an operator (or the controller 130 itself) can choose between the two different operating modes when using the work machine.

Here, the controller 130 can be configured to operate in a first mode (FIG. 2) wherein a first hydraulic pump 210 is configured to deliver hydraulic fluid from a tank 205 via a valve 230 to a travel circuit 240 and the transportation devices 108. A second hydraulic pump 220 is configured to deliver hydraulic fluid via the valve 230 to a work tool circuit 250 and the work tool 110.

After the operator inputs a change to the controller 130, or the controller 130 automatically determines the need for a change, the controller 130 can operate in a second mode (FIG. 3) where the work tool 110 is provided with hydraulic fluid via the valve 230 from both the first and the second hydraulic pumps 210, 220 at a priority over the travel circuit 240.

In one example, the controller 130 can be configured to default to the first mode of operation, as shown in FIG. 2. Then the operator of the work machine 100 can input instructions to the controller 130 to change to the second mode of operation, or the controller 130 can be configured to automatically change the mode of operation. Again, in the second mode of operation, the work tool 110 gets priority of the hydraulic power over the transportation devices 108 and the first hydraulic pump 210 and the second hydraulic pump 220 both deliver hydraulic fluid to the work tool 110 before any hydraulic fluid flows to the transportation devices 108. Accordingly, in one embodiment, the work tool does not get just a supplement of fluid from the first hydraulic pump 210, but instead gets a full priority.

The operator input to toggle from the first mode of operation to the second mode of operation can be via the input devices 140, which can be an input device such as a joystick, toggle switch, lever, and a touchscreen on the monitor.

For example, the machine monitor 150 (FIG. 1) can show a menu including different options and controls for the work machine 100 and the operator can use a software feature to toggle the control of the controller operating logic.

Accordingly, the operator has a choice to enable a single hydraulic pump for the transportation devices 108 or to absolve the transportation devices 108 and provide needed hydraulic flow to the work tool 110.

Accordingly, the present disclosure provides a system for controlling operation of the work machine 100 wherein the system can include the hydraulic system 120 to provide power to operate transportation devices 108 of the work machine 100 and the work tool 110 of the work machine 100. The system can further include the controller 130 configured to operate in a first mode wherein the first hydraulic pump 210 is configured to deliver hydraulic fluid to the transportation devices 108 and the second hydraulic pump 220 is configured to deliver hydraulic fluid to the work tool 110. The controller 130 can also operate in a second mode wherein the work tool 110 is provided with hydraulic fluid from both the first and the second hydraulic pumps 210, 220.

As noted, the controller 130 can be configured to default to the first mode of operation. The machine operator (or the controller 130 itself) can opt to toggle to the second mode of operation.

INDUSTRIAL APPLICABILITY

The present system is applicable during many situations in road construction. For example, when operating an excavator machine or other electro-hydraulic work machines.

Figure 4:
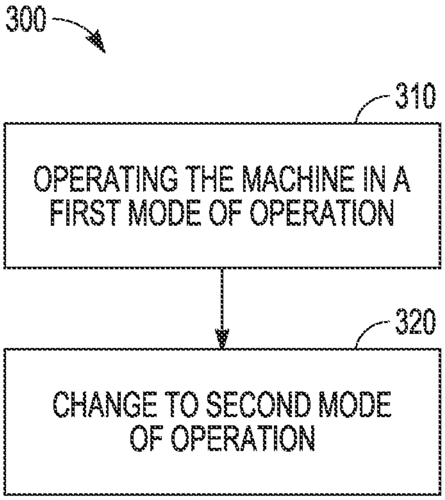
FIG. 4 shows a method for operating a work machine, in accordance with one embodiment.

FIG. 4 shows a method (300) for operating a work machine, in accordance with one embodiment. The method (300) can include operating the work machine in a first mode of operation (310) wherein a first hydraulic pump is configured to deliver hydraulic fluid to transportation devices and a second hydraulic pump is configured to deliver hydraulic fluid to a work tool of the work machine and changing to a second mode of operation (320) wherein the work tool is provided with hydraulic fluid from both the first and the second hydraulic pumps.

In one option, the method (300) can include a controller of the work machine being configured to default to the first mode of operation. In one embodiment, an operator of the work machine can input an instruction to the controller to change to the second mode of operation and the work tool gets priority of the hydraulic power over the transportation devices.

As noted above, the machine monitor menu can include an option to toggle the control of the controller operating logic. Accordingly, an operator has a choice to enable a single hydraulic pump for the transportation devices or to absolve the transportation devices and provide needed flow to the work tool.

Accordingly, the present disclosure relates to the function of work machines. Currently, a hydraulic excavator with two pumps dedicates a single pump to a travel circuit while another pump for work tool operation when functions are combined.

However, this system leads to a loss of flow for a tool when operating a high flow or high-power tool. Thus, the present disclosure pertains to travel to tool control priority function for an electro-hydraulic controlled excavator. A software feature can be provided to toggle the control of a straight travel logic directly in a machine monitor menu. The toggle of this switch gives a user choice to enable a single pump to travel assignment or to provide the desired flow to the tool at priority over the base machine function.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:

a frame;

transportation devices coupled to the frame;

a work tool coupled to the frame;

a hydraulic system to provide power to operate the transportation devices and the work tool; and a controller configured to operate in a first mode wherein a first hydraulic pump is configured to deliver hydraulic fluid to the transportation devices and a second hydraulic pump is configured to deliver hydraulic fluid to the work tool, and wherein the controller is configured to operate in a second mode wherein the work tool is provided with hydraulic fluid from both the first and the second hydraulic pumps such that the work tool gets priority of the hydraulic fluid over the transportation devices and receives the hydraulic fluid before any hydraulic fluid flows to the transportation devices.

2. The work machine of claim 1, wherein the transportation devices include tracks or wheels.

3. The work machine of claim 1, wherein the controller is configured to default to the first mode of operation and change to the second mode when the controller receives input to operate both the transportation devices and the work tool.

4. The work machine of claim 1, wherein an operator of the work machine inputs an instruction to the controller to change from the first mode to the second mode of operation and the work tool gets priority of the hydraulic power over the transportation devices and the first hydraulic pump and the second hydraulic pump both deliver hydraulic fluid to the work tool before any hydraulic fluid flows to the transportation devices.

5. The work machine of claim 4, wherein a machine monitor menu includes an option to toggle a control of an operating logic of the controller to change from the first mode to the second mode.

6. The work machine of claim 1, wherein the work machine is an excavator machine and the work tool includes a boom, a stick, and a work implement combination.

7. The work machine of claim 6, wherein the excavator machine is an electro-hydraulic controlled excavator machine.

8. A work machine comprising:

a frame;

transportation devices coupled to the frame;

a work tool coupled to the frame;

a hydraulic system to provide power to operate the transportation devices and the work tool; and a controller configured to operate in a first mode wherein a first hydraulic pump is configured to deliver hydraulic fluid to the transportation devices and a second hydraulic pump is configured to deliver hydraulic fluid to the work tool, and wherein the controller is configured to operate in a second mode wherein the work tool is provided with hydraulic fluid from both the first and the second hydraulic pumps, wherein an operator has a choice to enable a single hydraulic pump for the transportation devices or to absolve the transportation devices and provide needed hydraulic flow to the work tool from the first and the second hydraulic pumps.

9. A system for controlling operation of a work machine, comprising:

a hydraulic system to provide power to operate transportation devices of the work machine and a work tool of the work machine; and a controller configured to operate in a first mode wherein a first hydraulic pump is configured to deliver hydraulic fluid to the transportation devices and a second hydraulic pump is configured to deliver hydraulic fluid to the work tool, and wherein the controller can is configured to operate in a second mode wherein the work tool is provided with hydraulic fluid from both the first and the second hydraulic pumps such that the work tool gets priority of the hydraulic fluid over the transportation devices and receives the hydraulic fluid before any hydraulic fluid flows to the transportation devices.

10. The system of claim 9, wherein the transportation devices include tracks or wheels.

11. The system of claim 9, wherein the controller is configured to default to the first mode of operation and change to the second mode when the controller receives input to operate both the transportation devices and the work tool.

12. The system of claim 9, wherein an operator of the work machine inputs an instruction to the controller to change from the first mode to the second mode of operation and the work tool gets priority of the hydraulic power over the transportation devices and the first hydraulic pump and the second hydraulic pump both deliver hydraulic fluid to the work tool before any hydraulic fluid flows to the transportation devices.

13. The system of claim 12, wherein a machine monitor menu includes an option to toggle a control of an operating logic of the controller to change from the first mode to the second mode.

14. The system of claim 9, wherein the work machine is an excavator machine and the work tool includes a boom, a stick, and a work implement combination.

15. A system for controlling operation of a work machine, comprising:

a hydraulic system to provide power to operate transportation devices of the work machine and a work tool of the work machine; and a controller configured to operate in a first mode wherein a first hydraulic pump is configured to deliver hydraulic fluid to the transportation devices and a second hydraulic pump is configured to deliver hydraulic fluid to the work tool, and wherein the controller is configured to operate in a second mode wherein the work tool is provided with hydraulic fluid from both the first and the second hydraulic pumps, wherein an operator has a choice to enable a single hydraulic pump for the transportation devices or to absolve the transportation devices and provide needed hydraulic flow to the work tool from the first and the second hydraulic pumps.

* * * * *